(12) United States Patent
Goodsell et al.

(10) Patent No.: US 6,495,753 B1
(45) Date of Patent: Dec. 17, 2002

(54) LARGE CAPACITY FIRE RATED POKE THROUGH FITTING

(75) Inventors: John P. Goodsell, Stratford, CT (US); Joseph V. DeBartolo, Jr., North Stonington, CT (US); Nelson Bonilla, West Haven, CT (US); Sorin Mortun, Irvington, NY (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/702,822

(22) Filed: Nov. 1, 2000

(51) Int. Cl.$^7$ .................................................. H02G 3/04
(52) U.S. Cl. ........................... 174/48; 174/52; 52/220.8
(58) Field of Search .............................. 174/48, 53, 49, 174/50, 51; 220/3.3, 3.4, 3.5; 52/220.5, 220.7, 220.8; 439/535, 536

(56) References Cited

U.S. PATENT DOCUMENTS

| 4,243,835 A | | 1/1981 | Ehrenfels | 174/48 |
|---|---|---|---|---|
| 4,323,724 A | * | 4/1982 | Shine | 174/48 |
| 4,419,535 A | * | 12/1983 | O'Hara | 174/48 |
| 4,477,694 A | | 10/1984 | Kohaut | 174/48 |
| 4,496,790 A | | 1/1985 | Spencer | 174/48 |
| 4,573,297 A | | 3/1986 | Benscoter et al. | 52/221 |
| RE32,678 E | | 5/1988 | Benscoter et al. | 52/221 |
| 4,770,643 A | | 9/1988 | Castellani et al. | 439/135 |
| 4,901,488 A | | 2/1990 | Murota et al. | 52/232 |
| 5,003,127 A | | 3/1991 | Sosinski et al. | 174/48 |
| 5,032,690 A | | 7/1991 | Bloom | 174/48 |
| 5,058,341 A | | 10/1991 | Harbeke, Jr. | 52/232 |
| 5,155,957 A | * | 10/1992 | Robertson et al. | 52/232 |
| 5,747,732 A | | 5/1998 | Bera et al. | 174/48 |
| 5,763,826 A | | 6/1998 | Castellani et al. | 174/48 |
| 5,814,764 A | * | 9/1998 | Kohaut | 174/48 |
| 6,018,126 A | * | 1/2000 | Castellani et al. | 52/220.8 X |

* cited by examiner

Primary Examiner—Dean A. Reichard
Assistant Examiner—Dhiru R Patel
(74) Attorney, Agent, or Firm—Jeffrey J. Howell; Alfred N. Goodman

(57) ABSTRACT

A fire rated poke-through floor fitting for extending through an aperture in a floor having a conduit with a first surface and a second surface and at least one passageway extending from the first surface to the second surface. Electrical wire passes from a side door of the floor, through a conduit, to a second side of the floor. Intumescent material is located adjacent the at least passageway an expands inwardly through the at least one passageway when it is exposed to a predetermined amount of heat, resisting transfer of heat, smoke, and flame from the second side of the floor of the first side of the floor.

27 Claims, 5 Drawing Sheets

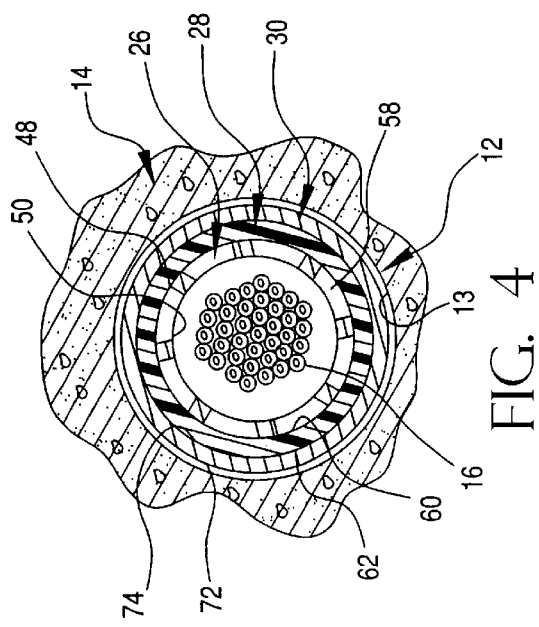
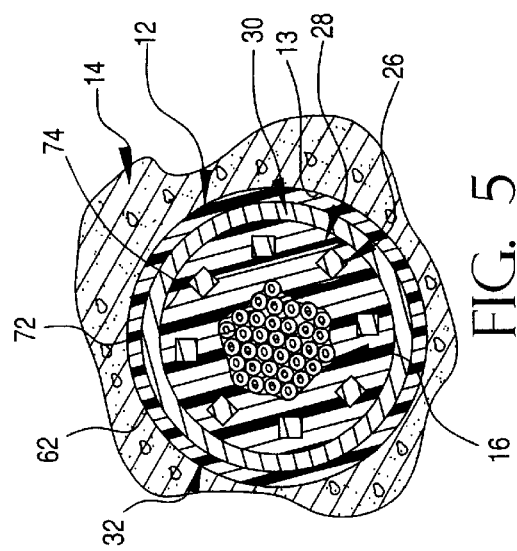
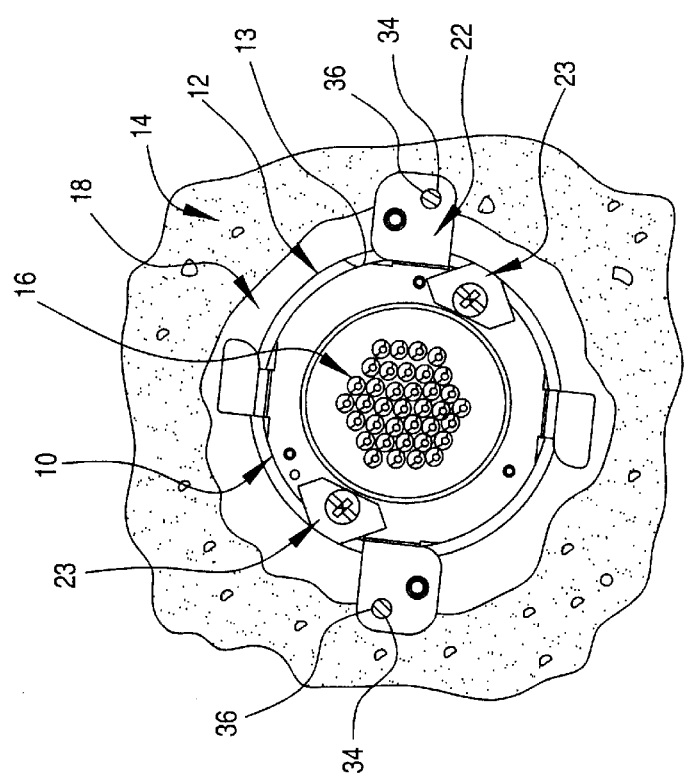

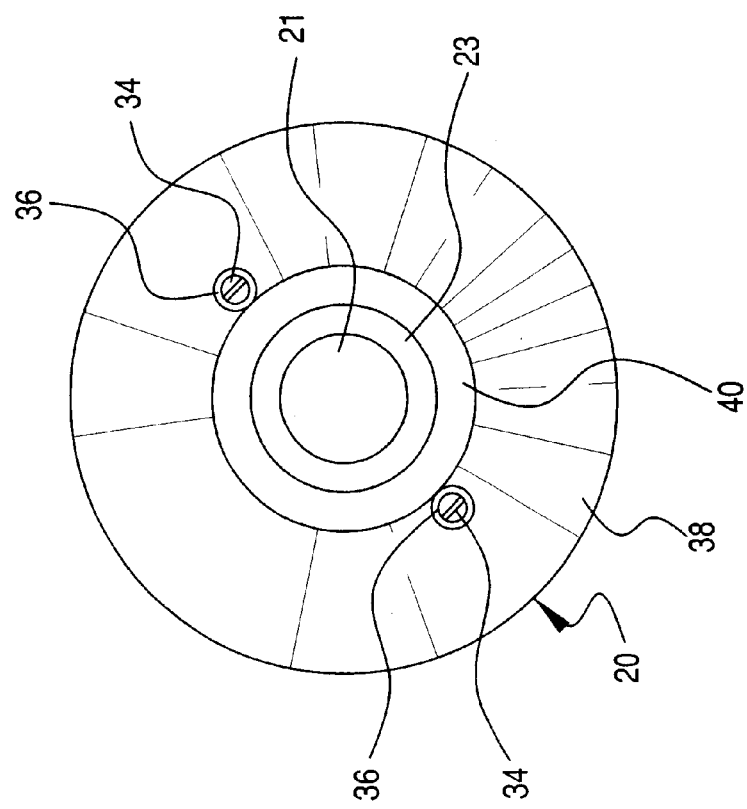
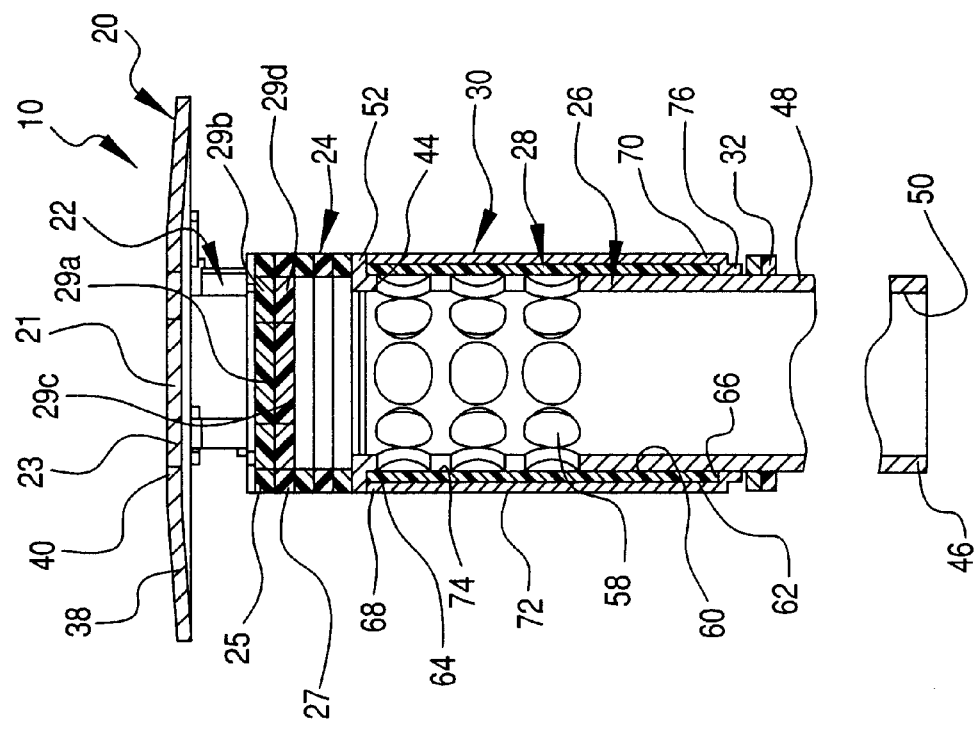

LARGE CAPACITY FIRE RATED POKE THROUGH FITTING

FIELD OF THE INVENTION

The present invention relates to a poke-through floor fitting to enable electrical wires to safely pass through a floor. More specifically, the present invention relates to a fire-rated poke-through floor fitting having numerous telecommunications wires extending therethrough and intumescent material that resists the transfer of heat, smoke and flame through the fitting in case of fire.

BACKGROUND OF THE INVENTION

Typically, fire-rated poke-through fittings provide a floor receptacle for electrical power outlets and/or for telecommunication jacks. Generally, these poke-through fittings are mounted in a core-drilled, approximately three or four inch diameter hole, which is commonly formed in a concrete floor.

Prior art fittings can prove hazardous if heat is easily transmitted through the fitting, either by the conductors or through the fitting itself, thus permitting heat from a fire to be transmitted through floors of a building. This problem has become more difficult in the last several years as additional conductors, for power and communications including voice and data, are used in poke-through fittings. The cross sectional area of a fitting may only be comprised of a predetermined amount of electrical wire, typically the electrical wire may only represent about 40 percent of the total cross sectional area of the fitting. Therefore, the more electrical wires passed through a fitting, the wider the fitting must be, and the wider the fitting, the more volume or cross-sectional area there is in the fitting through which heat can to be transmitted. Conventional fittings have reduced the diameter of the fitting to reduce the amount of heat, smoke and flame capable of passing through the fitting; however, this also reduces the number and/or volume of wires that can pass therethrough.

Since it is advantageous to increase the number of electrically and thermally conductive wires used in these fittings and still maintain a three or four inch aperture in the floor, so that a minimal number of holes or passageways are made therein, the size of the conduit must increase. Increasing the diameter of the conduit, as stated above, increases the heat passable therethrough. Therefore, there is an ongoing need to develop an apparatus having a conduit that is as large as possible, while still resisting heat, smoke, and flame from passing therethrough.

Examples of prior art fittings are disclosed in the following U.S. Pat. Nos.: 4,770,643 and 5,763,826 to Castellani et al.; 5,032,690 to Bloom; 5,058,341 to Harbeke, Jr.; and 5,970,670 to Hoffman, the disclosures of which are hereby incorporated by reference.

SUMMARY OF THE INVENTION

Accordingly, an object of this invention is to provide an improved fire-rated poke-through floor fitting.

Another object of this invention is to provide a floor fitting capable of limiting the transfer of heat, smoke and flame from a fire therethrough, while still allowing numerous electrical wires to pass therethrough.

Yet another object of this invention is provide a floor fitting about the same size as the aperture in the floor and still prevent heat, smoke and flame from a fire from passing therethrough.

The foregoing objects are basically obtained by providing a fitting for extending through an aperture in a floor, comprising a conduit having a first surface and a second surface, at least one passageway extending from said first surface to said second surface, at least one electrical wire passing through the conduit and intumescent material located adjacent the inside of the at least one passageway, the intumescent material expanding inwardly through the at least one passageway when exposed to a predetermined amount of heat.

Other objects, advantages and salient features of the invention will become apparent from the following detailed description which, taken in conjunction with the annexed drawings, discloses a preferred embodiment of the invention.

BRIEF DESCRIPTION OF THE DRAWINGS

Referring to the drawings which form a part of this disclosure:

FIG. 3 is a cross-sectional top plan view of the poke-through floor fitting of FIG. 1 taken along lines 3—3.

FIG. 4 is a cross-sectional top plan view of the poke-through floor fitting of FIG. 1 taken along lines 4—4.

FIG. 5 is a cross-sectional top plan view of the poke-through floor fitting of FIG. 2 taken along lines 5—5 and showing the expanded intumescent material.

FIG. 7 is a cross-sectional side elevational view of the fitting of FIG. 1 without the electrical wires extending therethrough.

FIG. 8 is a top view of the fitting shown in FIG. 7.

DETAILED DESCRIPTION OF PREFERRED EMBODIMENTS

Figure 2:
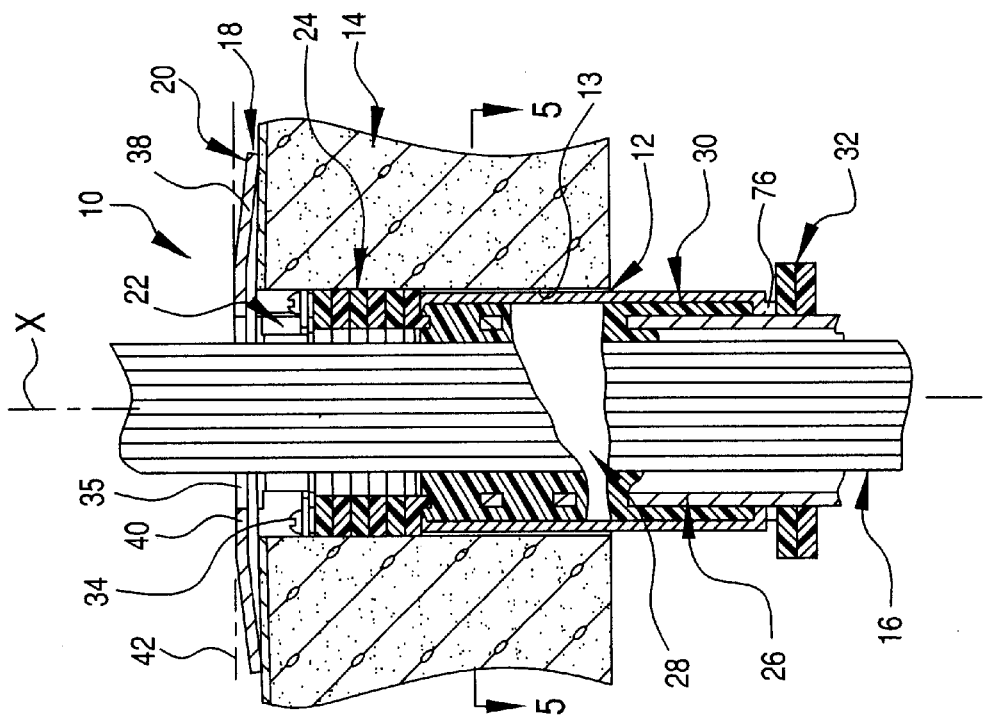
FIG. 2 is a cross-sectional side elevational view of the poke-through floor fitting of FIG. 1 with the intumescent material expanded radially inwardly through the apertures the conduit after exposure to a predetermined amount of heat.

FIGS. 1–8 illustrate a fitting 10 in accordance with a preferred embodiment of the present invention. Fitting 10 is a fire-rated, poke-through floor fitting. When assembled, fitting 10 is preferably intended to be inserted into a bore, opening or aperture 12 formed in a concrete floor 14. Fitting 10 preferably has an outer or external diameter that is substantially the same size as or slightly less than the diameter of cylindrical surface 13 of aperture 12, but may be any size desired. The fitting 10 provides easy access for electrical wires 16 to pass through the floor. Preferably, fitting 10 provides access to 36 telecommunications wires or other types of electrical wires including power wires. The fitting 10 provides access through floor 14 and on top of any flooring 18, such as carpeting, which is placed on top of floor 14.

Although fitting 10 is illustrated with a concrete floor 14, fitting 10 can be used in any surface containing an opening capable of receiving fitting 10, such as a concrete slab or deck or any other surface. Preferably fitting 10 is inserted into an opening 12 that is generally about a three or four inch hole, but may be inserted into any size aperture desired. Fitting 10 is generally inserted from first side 15 of floor 14 through opening 12 to second side 17 of floor 14. However, fitting 10 may be inserted in any manner desired.

Wires 16 are preferably telecommunication wires for Category 3, 5, 5E, or 6 electrical connectors, but can be any type of wires for any electrical or non-electrical device or devices, such as an electrical outlet, a computer, telephone, or facsimile machine, and can include metallic or glass wires, such as copper wires and fiber optic cables.

Fitting 10 is formed of a flange 20, a bracket 22, positioning clips 23, intumescent rings or collars 24, wire tube 26, fire barrier 28, sleeve 30 and intumescent rings or collars 32.

Figure 6:
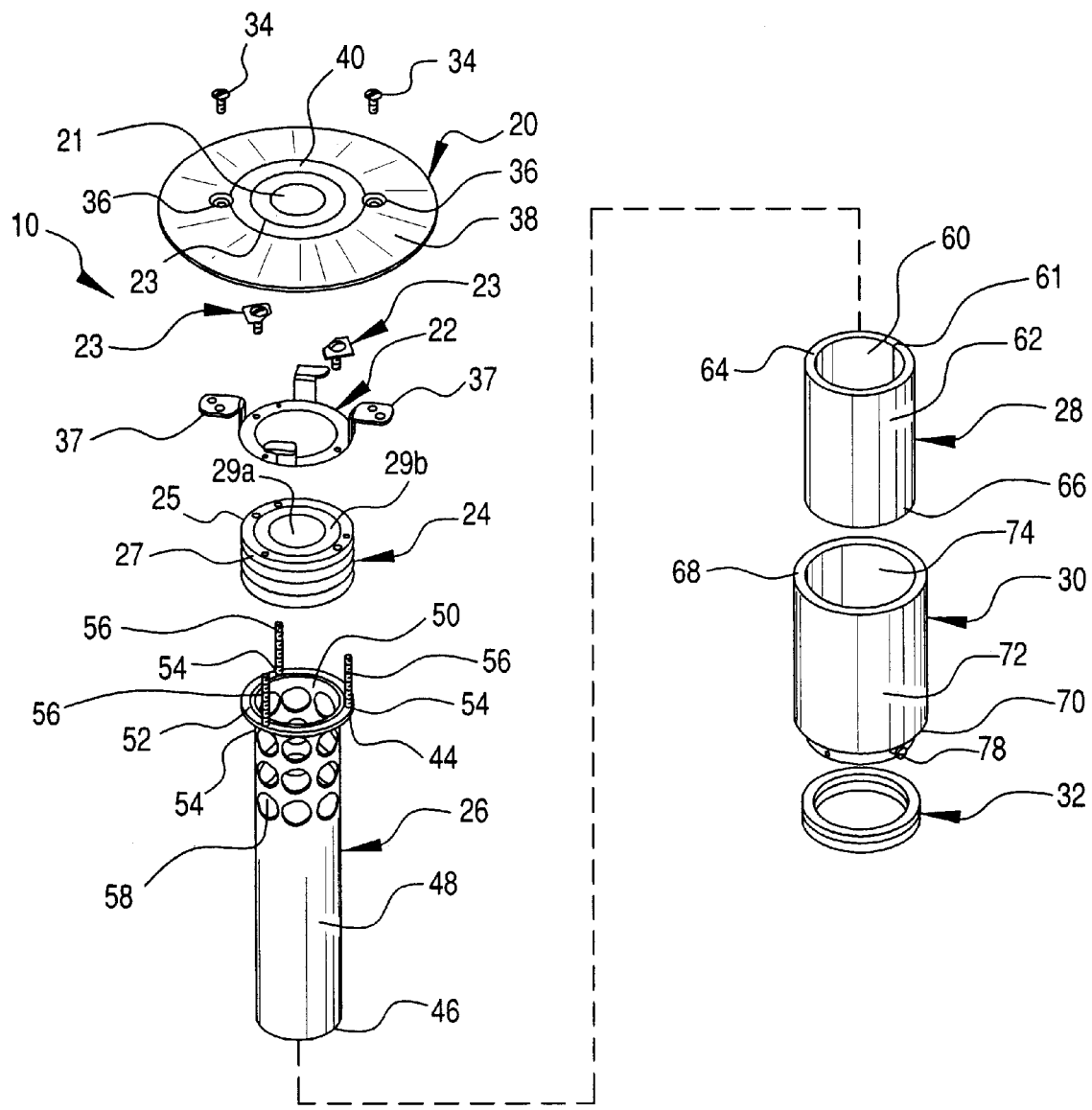
FIG. 6 is an exploded, perspective side view of the fitting of FIG. 1.

As seen in FIGS. 6–8, flange 20 is positioned on top of bracket 22 and secured thereto to by screws 34. Flange 20 has a knock out portion or preferably at least two knock out portions 21 and 23 in inner portion 40 as seen in FIGS. 6 and 7. The multiple knock out portions allow an installer to produce a hole or aperture 35 in inner portion 40 that is approximately the same size or larger than the diameter of the wires passing therethrough. Knock outs 21 and 23 are preferably substantially aligned with wire conduit 26. However, flange 20, may have a smooth flat finish with no knock outs and no apertures, thus requiring drilling in the flange if wires are to be extending through the fitting. Additionally, flange 20 can have an access opening 35 precut of formed in the inner portion 40. Opening 35 may be partially or completely filled with a gasket that helps hold and position wires 16 when extending through aperture 35. Flange 20 also has holes 36 for receiving screws 34. Screws 34 rigidly secure flange 20 to upper extensions 37 of bracket 22. Flange 20 has an outer portion 38 extending from inner portion 40 in an inclined manner to provide a gradual increasing of fitting 10 from flooring 18.

Preferably, flange 20 is made of metal. Also, the uppermost portion of flange 20 is substantially flush with substantially horizontal plane 42 that is substantially parallel to the top of the floor 14. Further, flange 20 preferably has a total vertical height of approximately 0.50 inch, such as about 0.53 inch. Thus, the height of the plane 42, or the uppermost portion of flange 20 can be about 0.50 to about 0.53 inch. This relatively low height results in a low profile for fitting 10 which is aesthetically pleasing and is less of an obstruction to those walking on floor 14 or to the furniture on floor 14.

The basic structure of the bracket or floor cup 22 and positioning clips 23 in connection with fire-rated poke-through fittings are generally known in the art, and therefore will not be described in great detail herein. Bracket 22 is preferably a ring shaped metal bracket with L-shaped extensions 37 extending therefrom. Positioning clips 23 are preferably tapered or pointed metal tabs that screw into bracket 22. The pointed tabs are sized and adapted to engage the surface 13 of opening 12. However, bracket 22 and clips 23 may be any device or devices known in the art the art that would couple conduit 26 to flange 20 and position and hold conduit 26 in opening 12.

Intumescent rings 24 and 32 are also known in the art and expand radially outwardly and, in the case of rings 24, radially inwardly, when exposed to a predetermined amount of heat, to contact surface 13 of floor 14 to prevent heat, smoke, and flame from passing through opening 12 around fitting 10. Each of the top two rings or discs 25 and 27 of intumescent rings 24 preferably have two knock out portions 29a and 29b and 29c and 29d, respectively. However each ring may have one knock out portion, two knock out portions or more. Additionally, the rings may be precut with an aperture or opening extending therethrough or with no knock out portions, requiring drilling or forming a hole in the rings during installation. The knock out portions are removed when installed, to allow an installer to produce a hole through the top two rings of rings 24 that is about the same size as the wires passing therethrough. It is noted that any number of the intumescent rings 24 may have knock out portions and it is not necessary for only the top two rings to have knock out portions.

As seen in FIGS. 6 and 7, wire tube or conduit 26 is preferably a cylindrical metal tube and has a first end 44, a second end 46, a first or exterior surface 48 and a second or interior surface 50. Conduit 26 is preferably approximately two inches in diameter, but can be any size desired to fit in opening 12. First end 44 has an upper disk 52 extending radially outwardly therefrom and substantially perpendicularly from exterior surface 48. Upper disk 52 is preferably unitary with conduit 26 but can be coupled thereto by any means desired. Upper disk 52 preferably has three holes or apertures 54 therethrough for passage of screws 56. Wire conduit 26 preferably has 24 circular, transverse apertures or holes or passageways 58 therein, the apertures extending from the exterior surface 48, through the wire tube and to interior surface 50 or the interior of conduit 26. Apertures or perforations 58 are advantageously arranged in three rows of eight, adjacent the first end 44 of the wire conduit 26. However, apertures 58 can be located anywhere along the wire conduit 26, can range from one to any number desired and can be any shape desired. Additionally, wire conduit 26 does not necessarily have to be a cylindrical tube and may be any configuration or material that would allow wires to pass therethrough.

Fire barrier 28 is preferably a hollow cylinder, sleeve or tube of intumescent fire material that preferably substantially surrounds or completely surrounds conduit 26. However, fire barrier 28 does not necessarily need to be a tube and can be any shape or size desired, such as a layer or strip of intumescent material. Barrier 28 can be a unitary sleeve or it can have separation point 61, as seen specifically in FIG. 6, which would allow the barrier to be easily wrapped around conduit 26. Fire barrier 28 preferably has an interior surface 60, an exterior surface 62, a first end 64 and a second end 66. As seen in FIGS. 3–5, the diameter of interior surface 60 of barrier 28 is slightly larger than or substantially the same as the exterior surface 48 of wire tube 26 and extends along an axial length of external surface 48 of conduit 26.

Figure 1:
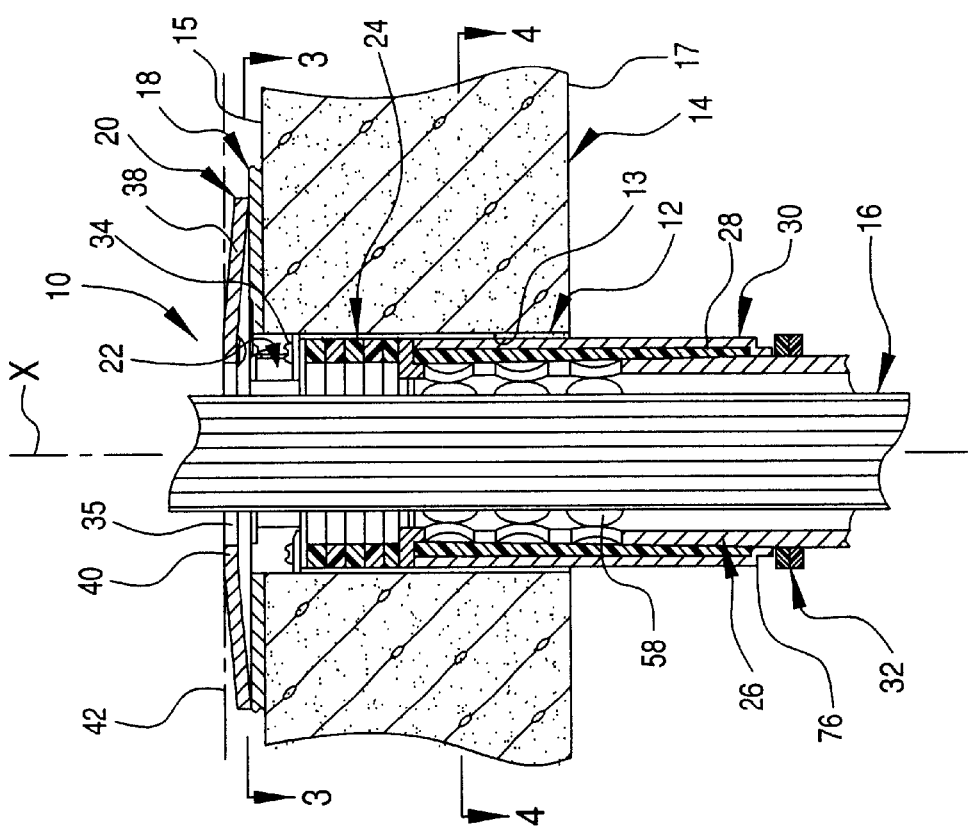
FIG. 1 is a cross-sectional side elevational view of a poke-through floor fitting in accordance with the preferred embodiment of the present invention.

As seen in FIGS. 6 and 7, sleeve, outer wall or collar 30 is preferably a metal tube having a first end 68, a second end 70, an exterior surface 72 and an interior surface 74. As seen in FIGS. 3–5, the diameter of interior surface 74 of sleeve 30 is generally slightly larger than or substantially the same as the exterior surface 62 of fire barrier 28. As seen in FIGS. 1, 2 and 7, at second end 70, sleeve or tube 30 curves or extends inwardly toward central axis X, and forms portion 76. Interior surface 74 of portion 76 preferably has a diameter substantially similar to or slightly larger than both the interior surface 60 of fire barrier 28 and exterior surface 48 of wire conduit 26. Sleeve 30 does not necessarily have to be metal or a tube, and can be any configuration and material desired. For example, sleeve 30 can be any other high temperature material and any shape that would allow it to substantially conform to the exterior surface of barrier 28, such as a rectangular tube, hexagonal tube, or any other polygon or portion of any polygon. Additionally sleeve, 30 preferably has a screw or bolt 78 passing therethrough that engages exterior surface 48 of conduit 26 and couples sleeve 30 thereto, as seen in FIG. 6. However, sleeve 30 may be coupled to conduit 26 by any means known in the art.

Assembly

Bracket 22, in conjunction with positioning clips 23, locate and secure fitting 10 within bore 12 at the top of floor 14, as seen specifically in FIGS. 1 and 2. Bracket 22, intumescent rings 24 and an upper disk 52 of wire tube 26 are all secured or rigidly coupled together by screws 56 and form a passageway, as is known in the art. Flange 20 is then coupled to bracket 22 by inserting screws 34 through holes 36 and into upper extensions 37 of bracket 22. Positioning clips 23 are then attached or secured to bracket 22 by screws or any other method known in the art. As seen specifically on FIG. 3, positioning clips extend outwardly from bracket 22 at least as far and preferably farther than the diameter of external surface 72 of sleeve 30.

Barrier 28 preferably is positioned adjacent and substantially covering the area defined by apertures 58 on wire conduit 26 with interior surface 60 adjacent exterior surface 48 and first end 64 abutting or engaging upper disk 52. However, fire barrier 28 does not necessarily have to be a tube and may only cover a portion of wire conduit 26 and a portion of each or all of apertures 58. In other words, barrier 28 may only be a strip of intumescent material that covers as little as one portion of one aperture or barrier 28, or barrier 28 can be a sleeve that covers all the apertures and the entire length of the wire conduit or more. Additionally, there may be more than one fire barrier and each fire barrier 28 may be adjacent an aperture or a portion of an aperture or multiple apertures or the multiple fire barriers may be stacked upon each other. Barrier 28 is preferably adjacent to or partially within the apertures 58; however, barrier 28 may spaced from the apertures 58 if desired. In each case, barrier 28 is adjacent the inside of the passageway formed by the interior surface of wire conduit 26, and is in a position to move through apertures 58 into the inside of the wire conduit 26.

As seen in FIGS. 1 and 2, tube 30 extends over and substantially covers the entire fire barrier 28. First end 68 of tube 30 abuts or engages upper disk 52 with interior surface 74 adjacent and preferably engaging exterior surface 62 of barrier 28, and protrusion 76 of second end 70 abuts or engages second end 66 of barrier 28. Tube 30 does not necessarily need to cover substantially the entire barrier 28 and may cover only a portion thereof. Additionally, sleeve 30 may be any configuration desired. For example, sleeve 30 may be a small barrier, approximately the same size as an aperture 58, encapsulating a portion of barrier 28 therein, or it may be a strip or ring of material large enough to cover a portion of barrier 28. The intent of tube 30 is to accommodate a typical range of floor thicknesses.

Intumescent rings 32 are then coupled to conduit 26, preferably by interference fit or in any manner known in the art.

As seen in FIG. 1, fitting 10 is then inserted into opening 12 in floor 14. Flange 20 has a diameter greater than the diameter of opening 12, and therefore outer portion 38 rests on floor 14 or carpet 18, holding fitting 10 within opening 12. Positioning clips engage the surface 13 of opening 12 and position and hold fitting 10 substantially centered within and substantially static relative to the opening 12 and floor 14, as seen in FIG. 3, and preferably substantially perpendicular to floor 14 with axis X substantially perpendicular to plan 42.

An aperture is then drilled through inner portion 40. The aperture may be any size desired, usually depending on the number of wires the installer is intending to pass therethrough. Additionally, as described above, the flange may have a knock out portion or more than one knock out portion, such as portions 21 and 23. The flange 20 can have more than two knock portions and may have as many as desired. The installer knocks out portion 21 or 23 or both, depending on the number of wires to pass therethrough. For, example if the installer intended to pass about 18 wires therethrough, the inner portion would be knocked out. However, if the installer intended to install 36 wires therethrough, the outer portion would be knocked out. Additionally, the knock out portions in intumescent rings 24 are knocked out in a similar manner as described above for the flange 20. The hole drilled in flange 20 or the removal of knock out portions in the flange 20 and the intumescent rings 24 do not necessarily have to be done in any specific order during installation and may be done before, after or during installation of the fitting 10 into opening 12.

Electrical wires 16 are pulled from a second side 17 of the floor or from underneath the floor, through the conduit 26, intumescent rings 24, bracket 22 and aperture 35 in the flange 20, to a first side 15 of the floor or above the floor. At least one wire extends through conduit 26, but preferably 36 or more wires extend therethrough. Wires 16 can be passed through the fitting, one at a time or in groups of 2 or more, before, after or during the installation of the fitting into opening 12. Additionally, wires 16 can be passed through the fitting from the opposite direction (i.e. from the first side of the floor through the fitting and to the second side of the floor). Wires 16 are coupled to a power source (not shown) on the second side of the floor and to a receiving device (not shown), such as a telephone, computer, telecommunication device, power outlet or any other electrical or non-electrical device on the first side of the floor.

Operation

Under normal operating conditions, fitting 10 acts as a through passageway for wires 16. However, during a fire or other high temperature incident, fire barrier 28 expands to seal off conduit 26 and close the passageway therethrough and rings 24 and 32 expand radially outwardly to seal off opening 12. As seen in FIG. 2, when rings 32 expand from exposure to a predetermined amount of heat, rings 32 may not contact floor 14, depending on the height of the floor. Generally, the floor must be seven inches thick for rings 32 to contact floor 14.

As seen in FIGS. 2 and 5, after exposure to a predetermined amount of heat, fire barrier 28 also expands or swells. Since sleeve 30 is adjacent the exterior of barrier 28, barrier 28 cannot expand radially outwardly and must expand radially inwardly. Additionally, since first end 64 of barrier 28 abuts upper disk 52, which acts as an upper barrier, and second end 66 of barrier 28 abuts inner surface 74 of portion 76 of sleeve 30, which acts as a lower barrier, fire barrier 28 cannot expand axially upwardly or downwardly in a direction along a length of wire conduit 26 or axis X. When barrier 28 expands, it is forced to pass through apertures 58 and into the interior of wire conduit 26. As seen in FIG. 5, barrier 28 expands to and surrounds wires 16, therefore sealing off any excess open area, as can be seen in FIGS. 3 and 4. Since there is no excess room, flame, smoke and/or heat cannot travel upwardly from the second side of the floor through the conduit and to the first side of the floor. Preferably wires 16 are small diameter telecom wires, as described above, and therefore would conduct relatively minimal heat therethrough.

Additionally, wires 16 are preferably susceptible to melting when exposed to excessive heat. The wires 16 would therefore melt below the fitting or in the fitting, thus helping to reduce the transfer of heat through the conduit. In particular, when the wires melt in the fitting, the wires may melt above the second end 66 of the barrier 28, so that when barrier 28 expands radially inwardly, it completely blocks the passageway through the conduit, so that flame, heat and smoke from a fire cannot pass therethrough.

It is not necessary to have sleeve 30, as long as there is a device or barrier adjacent exterior surface 62 of barrier 28. For example, it is possible to position fitting and therefore fire barrier 28 adjacent the surface 13 of opening 12 and have the opening serve as a restraint for forcing fire barrier 28 inwardly. In addition, it is possible to have a fire barrier with an integral shell or surface that would force the expanding material inwardly.

Figure 10:
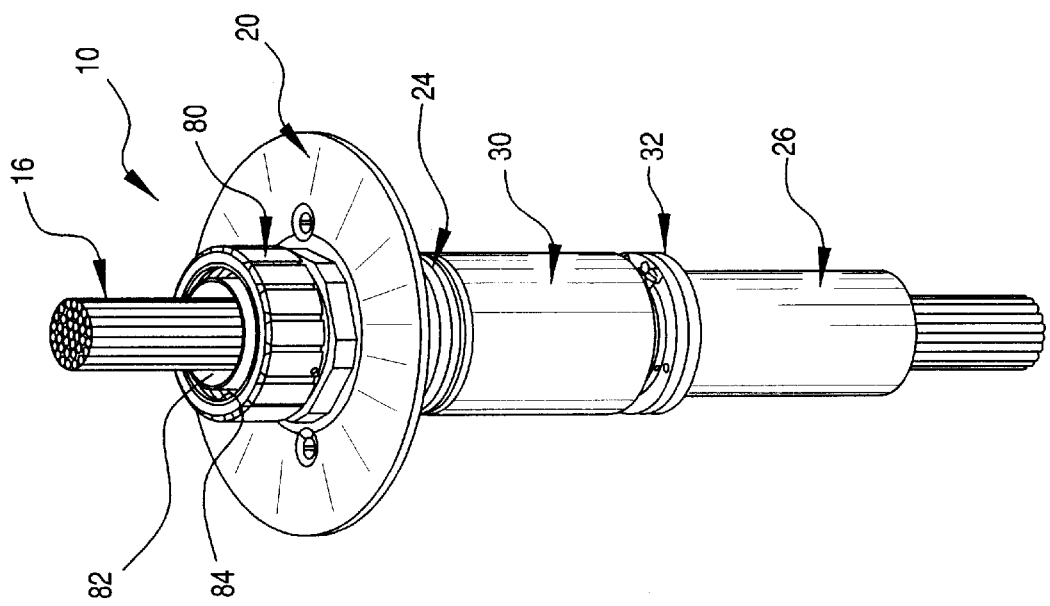
FIG. 10 is a perspective side view of the fitting of FIG. 9.
Figure 9:
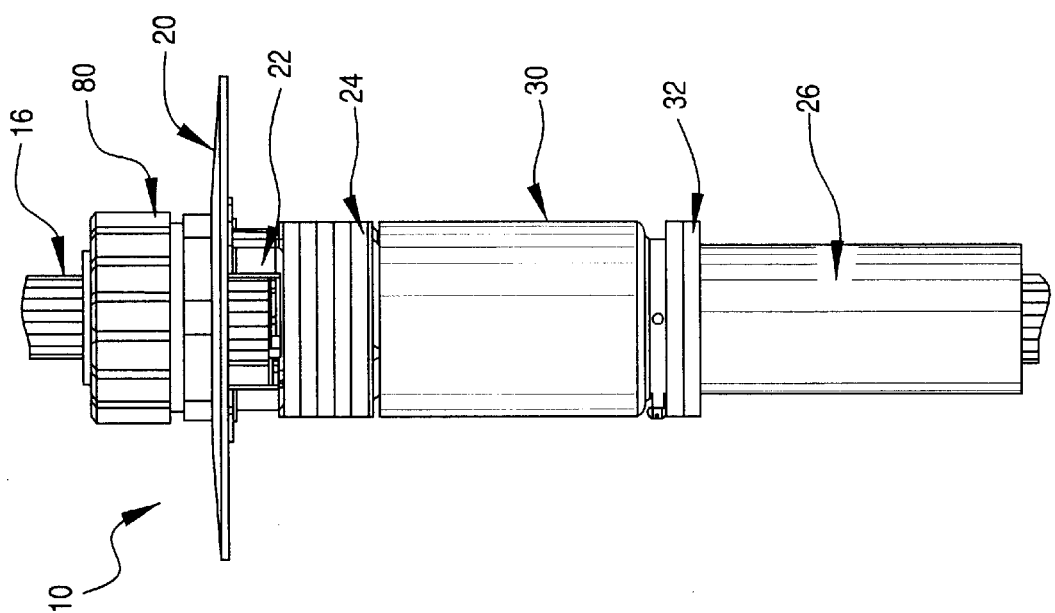
FIG. 9 is a side view of the poke-through floor fitting of FIG. 1 having a housing attached thereto at the top.

Embodiment of FIGS. 9 and 10

As seen in FIGS. 9 and 10, fitting 10 can have a housing or member 80 extending from flange 20 of fitting 10. Housing 80, as shown in FIGS. 9 and 10, is a cylindrical extension or tube having a through passageway 82 and aperture or hole 84. Housing 80 is coupled, either releasably or permanently, to flange 20 in any manner known in the art. For example, housing 80 may be coupled to flange 20 using threads, screws, adhesives, or friction or any other suitable means. Housing 80 can be coupled to flange 20 before, after or during installation of fitting 10 and may be any type of fitting known in the art, such as a tube, an elbow, or the like. Wires 16 extend through fitting 10, as described above and through passageway 82 of housing 80, which helps to direct and hold wires 16 in any direction desired by the installer or user.

What is claimed is:

1. A fitting for extending through an aperture in a floor, comprising:
    a conduit having a first surface and a second surface, at least one passageway extending from said first surface to said second surface substantially transverse to said conduit;
    at least one electrical wire adapted to pass through said conduit; and
    intumescent material located adjacent the inside of said at least one passageway, said intumescent material expanding inwardly through said at least one passageway when exposed to a predetermined amount of heat.

2. A fitting according to claim 1, further comprising
    a flange having at least one knock out portion therein rigidly coupled to and substantially aligned with said conduit.

3. A fitting according to claim 1, further comprising
    a disc formed of intumescent material rigidly coupled to said conduit and having at least one knock out therein.

4. A fitting according to claim 1, wherein
    said intumescent material is formed as a hollow cylinder substantially surrounding said conduit and extending along an axial length of said conduit.

5. A fitting according to claim 4, wherein
    said axial length of said conduit extends at least along a portion of said at least one passageway.

6. A fitting according to claim 1, further comprising
    an outer wall located adjacent said intumescent material.

7. A fitting according to claim 6, wherein
    said outer wall is a tube surrounding said intumescent material.

8. A fitting according to claim 1, wherein
    said aperture in the floor has at least a three inch diameter.

9. A fitting according to claim 1, wherein
    said conduit has a low profile.

10. A fitting according to claim 9, wherein
    said conduit does not extend more than 0.53 inches above the floor.

11. A fitting according to claim 1, wherein
    said at least one electrical wire comprises at least 36 telecommunication wires.

12. A fitting according to claim 1, wherein
    said at least one passageway comprises at least 24 passageways.

13. A fitting according to claim 12, wherein
    said intumescent material is formed as a hollow cylinder substantially surrounding said conduit and extends along an axial length of said conduit that includes substantially all of said at least 24 passageways.

14. A fitting according to claim 1, wherein
    said conduit is coupled to a member that extends above the floor and has an aperture therethrough.

15. A fitting according to claim 1, wherein
    said conduit includes an upper barrier and a lower barrier to limit movement of said intumescent material axially along said conduit.

16. A poke through fitting extending from a first side of a floor through an opening in the floor to a second side of the floor, comprising:
    a tube having a first surface and a second surface and having a plurality of transverse apertures extending from said first surface to said second surface;
    a plurality of electrical wires adapted to extend from said first side of said floor through said tube to said second side of said floor;
    a collar surrounding at least a part of said tube and having an interior surface; and
    a sleeve of intumescent material disposed between said first surface of said tube and said interior surface of said collar, said intumescent material extending radially inwardly through said plurality of apertures when exposed to a predetermined amount of heat.

17. A poke through fitting according to claim 16, wherein
    said sleeve of intumescent material extends along a length of said tube, said length including substantially all of said plurality of apertures.

18. A poke through fitting according to claim 16, wherein
    said opening in the floor has at least a three inch diameter.

19. A poke through fitting according to claim 16, wherein
    said conduit has a low profile.

20. A fitting according to claim 16, wherein
    said conduit does not extend more than 0.53 inches above the floor.

21. A fitting according to claim 16, wherein
    said plurality of electrical wires comprises at least 36 telecommunication wires.

22. A fitting according to claim 16, wherein
    said plurality of apertures comprises at least 24 apertures.

23. A fitting according to claim 22, wherein
    said intumescent surrounds said tube and extends along an axial length of said tube that includes substantially all of said at least 24 apertures.

24. A fitting according to claim 16, wherein
    said tube is coupled to a member that extends above the floor and has a passageway therethrough.

25. A fitting according to claim 16, wherein
said conduit includes an upper barrier and a lower barrier to limit movement of said intumescent material axially along said conduit.

26. A method for sealing an opening in a floor against smoke, heat and flame passing therethrough, comprising the steps of
forming a passageway in the opening extending from a first side to a second side of the floor,
forming an aperture communicating with the passageway and extending in a direction substantially transverse to the passageway,
positioning intumescent material adjacent the inside of the passageway, and
expanding the intumescent material towards the center of the passageway through the aperture when the intumescent material is exposed to a predetermined amount of heat, while preventing the intumescent material from expanding away from the center of the passageway.

27. A method for sealing according to claim 26, wherein said expanding step includes the step of limiting the movement of the intumescent material towards the first and second sides of the floor.

* * * * *